M. J. McLEAN.
PICTURE PUZZLE.
APPLICATION FILED MAR. 30, 1916.
1,189,598. Patented July 4, 1916.
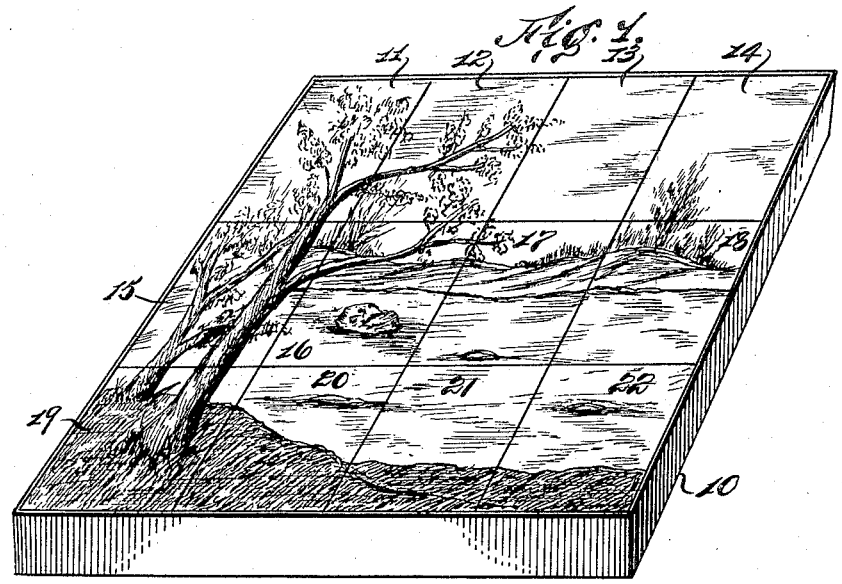
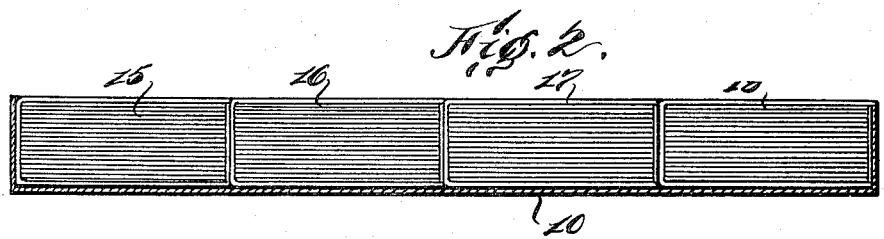
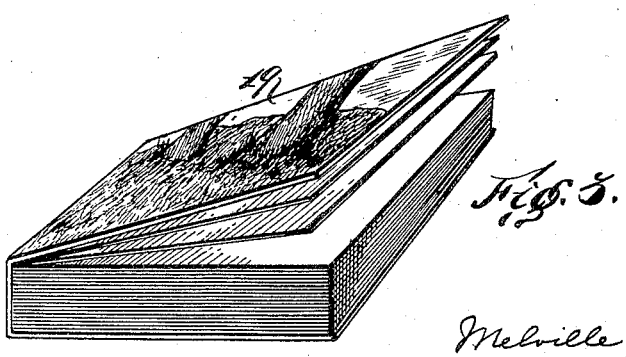
Inventor
Melville J. McLean
By his Attorney
Witness

UNITED STATES PATENT OFFICE.

MELVILLE J. McLEAN, OF TORONTO, ONTARIO, CANADA, ASSIGNOR TO J. M. DENT & SONS, LIMITED, OF LONDON, ENGLAND, A CORPORATION.

PICTURE-PUZZLE.

1,189,598.

Specification of Letters Patent. Patented July 4, 1916.

Application filed March 30, 1916. Serial No. 87,840.

*To all whom it may concern:*

Be it known that I, MELVILLE J. McLEAN, a subject of the King of the United Kingdom of Great Britain and Ireland, residing at Toronto, Canada, have invented certain new and useful Improvements in Picture-Puzzles, of which the following is a clear, full, and exact description.

This invention relates to picture puzzles and one of its objects is to produce an interesting and educational picture puzzle for children.

Other objects are to provide a picture puzzle in which each unit is in the nature of a book.

These being among the objects of my invention the same consists of certain novel features of construction to be hereinafter described and then claimed with reference to the accompanying drawings illustrating a desirable embodiment of the invention, in which—

Figure 1 is a perspective view of the complete picture puzzle, set in a box or frame, Fig. 2 is a transverse section, between the units of the puzzle, and Fig. 3 is a perspective view of one of the units.

Referring to the drawings, a box or frame 10 is preferably provided into which the parts of the puzzle may be set. In so far as the picture part of the puzzle herein is concerned, in that it is a cut up picture puzzle, it is similar to those already known. The picture such as shown in Fig. 1 desirably depicts a scene from a book, upon the covers of which book said picture is spread. The book such for instance as "*Alice in Wonderland*" is composed of a series of units 11 to 22, as shown on Fig. 1, or it may be composed of any other desired number of units. Each unit consists of separately covered signatures of the book so that each unit may be termed a signature unit, one of which is shown in detail in Fig. 3. Each covered signature unit of the book may contain as many pages as desired, and preferably each of the bound signature units has its picture portion reading in the same direction as the picture portion of any of the other units. Thus when the picture puzzle is set up the backs of the signature units may all be located to the left as shown in Fig. 2. The picture puzzle may be composed of covered signature units of one book only or it may be composed of one or more books, the picture represented being taken from any one of them. It is obvious that each of the signature units may be covered and bound like any ordinary stiff covered book.

From the above description it will be clear that the device does not consist merely in the well known picture puzzle which is composed of blocks or the like. Before the book is purchased the picture to be put together creates additional interest in the book composed of the signature-units, inasmuch as it illustrates a scene described in the book, and this is also the case with one in reading the book, because when the description of the scene in the book is reached the reader can take all the signature-units and properly combine them in order to depict said scene. The parts of the picture also constitute an index to the sequence in which the parts of the book should be read, and the cut-up picture forms a unique and attractive advertising for the book. The scene depicted on the covers may always be kept before the reader who may then pick out each signature-unit in succession, read it, and then return it to its proper place, thus preserving the picture, which may illustrate the theme of the book to be kept foremost before the reader.

It is obvious that this invention is susceptible to modification and is not restricted to the precise construction and arrangement shown.

What I claim as new is:

1. A picture puzzle, comprising a series of units, each consisting of separately covered signatures of a book, and the covers of said signature units being provided with separate portions of a picture depicting a scene from the book composed of said signatures.

2. A picture puzzle, comprising a series of units, each consisting of separately covered signatures of a book, the corresponding covers of said signature units being provided with separate portions of a picture depicting a scene from the book composed of said signatures, and the backs of said signature units being located to the left thereof, when the puzzle is set up.

Signed at Toronto this 15th day of March, 1916.

MELVILLE J. McLEAN.

Witnesses:
 JOHN RIGBY,
 E. DUELHENTY.

Copies of this patent may be obtained for five cents each, by addressing the "Commissioner of Patents, Washington, D. C."